US005417044A

United States Patent [19]
Russo

[11] Patent Number: 5,417,044
[45] Date of Patent: May 23, 1995

[54] HORSE MUCKING RAKE DEVICE

[76] Inventor: Anthony N. Russo, 22 Welisewitz Rd., East Amwell Township, Hunterdon Cty., N.J. 08551

[21] Appl. No.: 137,556

[22] Filed: Oct. 18, 1993

[51] Int. Cl.⁶ .............................................. A01D 7/06
[52] U.S. Cl. .................................... 56/400.11; 294/55
[58] Field of Search ............ 56/400.11, 400.12, 400.13; 294/52, 55; 209/418

[56] References Cited

U.S. PATENT DOCUMENTS

| | | |
|---|---|---|
| 427,055 | 5/1890 | Cushing . |
| 929,479 | 7/1909 | Parker . |
| 1,014,250 | 1/1912 | Norman . |
| 1,209,060 | 12/1916 | Synder . |
| 1,267,778 | 5/1918 | Leen . |
| 1,763,757 | 6/1930 | Charles ............................ 56/400.13 |
| 2,215,592 | 9/1040 | Nelson ............................. 56/400.13 |
| 3,094,348 | 7/1960 | Preziosi . |
| 3,310,332 | 4/1967 | Nelson . |
| 3,979,146 | 9/1976 | Berg ................................. 294/55 |
| 4,828,690 | 5/1989 | Montez ............................ 209/448 |
| 5,069,026 | 12/1991 | Johnson .......................... 56/400.11 |

Primary Examiner—Terry Lee Melius
Attorney, Agent, or Firm—Kenneth P. Glynn

[57] ABSTRACT

The present invention is directed to a horse mucking rake device. It includes a substantially straight, elongated handle as well as a base frame and a plurality of tines and, finally, a cage. The base frame is connected to the handle and extends outwardly at right angles from the angle at its area of connection in a substantially flat plane to establish a predetermined framed width. The tines extend from the base frame at right angles to the frame width and each of the tines are parallel to one another and have an upper segment and a lower segment. The upper segment is connected at its top to the base frame and its bottom is connected to the top of the lower segment. The lower segment ends in a terminus, that is, a tip or ending. The upper segment of each of the tines runs in a direction parallel to the handle and the lower segment of each of the tines forms an angle with an imaginary axis extending from the handle of about 30° to about 60°. The cage has a bottom, sidewalls, a back and a front. The back wall and the front wall and the sides and the bottom may be all formed of the same material and have the same basic dimensions and is typically a lattice. The front of the cage forms an angle relative to the bottom of the cage which substantially is equal to the angle formed by the lower segments of the tines relative to the handle.

20 Claims, 2 Drawing Sheets

HORSE MUCKING RAKE DEVICE

BACKGROUND OF THE INVENTION

1. Field of the Invention

The present invention relates to a horse mucking rake device. More specifically, it relates to such a device that has parallel, angled tines coupled with a cage which is specifically designed to aid in the separation of manure from shavings, chips and fine stone. Typically utilized as a base or bedding in a horse stall. The present invention device has been developed as a significant improvement both from the stand point of sifting and from the stand point of preventing pieces of manure from falling off during the shaking step usually involved in separating stall base material from manure.

2. Information Disclosure Statement

Rakes have been around for hundreds of years and numerous rakes have been developed for many different purposes. The following is a summary of a collection of prior art which is typical of the development of rakes.

U.S. Pat. No. 427,055 which issued to Maria Cushing in 1890 describes a shifting shovel which includes parallel tines and includes a hood and scoop arrangement near the handle.

U.S. Pat. No. 929,479 to Joseph Parker describes an agricultural shovel which includes U-shaped wire tines arranged in conjunction with a frame that includes a back and sidewalls.

U.S. Pat. No. 1,209,060 issued in 1916 to Wilbur Snyder describes a lawn rake which includes an arcuated sheet of mesh wire and wire bristles at the end of the mesh wire.

U.S. Pat. No. 1,267,778 issued to Charles Leen describes an agricultural implement which includes tines that have a 90° angle with the upper portion forming a back and the lower portion forming of a base and with sidewall extensions. This shovel has the tines facing toward the user so that the direction is reversed from the direction of the base of the handle and is non-parallel to the handle itself.

U.S. Pat. No. 1,014,250 issued to Sterling Norman describes a rake which includes a rounded basket with a home at its outer edge with short teeth.

U.S. Pat. No. 3,094,348 describes a scoop shovel. This patent issued to Anthony Preziosi in 1963 and describes a shovel with straight tines or pickets but with an encasement having a back and sides.

U.S. Pat. No. 3,310,332 issued to Herbert Nelson describes a liter fork and yard tool which includes straight tines and a scoop area behind the tines and close to the shovel handle.

U.S. Pat. No. 3,979,146 to Robert Berg describes a beach cleaning apparatus which utilizes a wire mesh bag with a firm blade for a leading edge. It has an open end which faces the direction of the user.

U.S. Pat. No. 4,828,690 issued to Obed Montez describes a hand tool for sifting debris from sand and soil. It includes a comb leading edge with wide, short teeth and ridges running parallel to one another and terminating in a side-U mesh sheet with open sides and an open front. The entire device is attached to a handle which is adjustable and is attached so as to face the user rather than face the direction opposite the user.

U.S. Pat. No. 5,069,026 issued to Richard Johnson in 1991 describes a push-pull rake which includes upstanding teeth and a platform against a rear wall of a three sided receptacle area.

Notwithstanding all of the prior art cited and the many variations on rakes, no patent teaches or renders obvious the present invention. Horse mucking rake device which includes a unique tine arrangement coupled with a special cage attached thereto as described below.

SUMMARY OF THE INVENTION

The present invention is directed to a horse mucking rake device. It includes a substantially straight, elongated handle as well as a base frame and a plurality of tines and, finally, a cage. The base frame is connected to the handle and extends outwardly at right angles from the angle at its area of connection in a substantially flat plane to establish a predetermined framed width. The tines extend from the base frame at right angles to the frame width and each of the tines are parallel to one another and have an upper segment and a lower segment. The upper segment is connected at its top to the base frame and its bottom is connected to the top of the lower segment. The lower segment ends in a terminus, that is, a tip or ending. The upper segment of each of the tines runs in a direction parallel to the handle and the lower segment of each of the tines forms an angle with an imaginary axis extending from the handle of about 30° to about 60°. The cage has a bottom, sidewalls, a back and a front. The back wall and the front wall and the sides and the bottom may be all formed of the same material and have the same basic dimensions and is typically a lattice. The front of the cage forms an angle relative to the bottom of the cage which substantially is equal to the angle formed by the lower segments of the tines relative to the handle.

BRIEF DESCRIPTION OF THE DRAWINGS

The present invention is more fully understood when the drawings appended hereto are taken in conjunction with the specification herein, wherein.

DETAILED DESCRIPTION OF THE PRESENT INVENTION

As mentioned in the summary, the present invention involves a rake device which includes a handle, a frame, a plurality of tines, and a cage. The handle may generally be made of wood but could be made of metal or other material such as tubular plastic and the frame may be caste, molded or otherwise formed metal or plastic and the tines likewise may be metal or plastic. The cage could be made of metal, plastic or even woven wood but is preferably formed of woven wire material.

Figure 1:
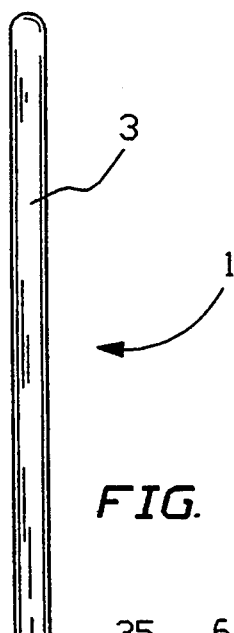
FIG. 1 illustrates a side view of a present invention horse mucking rake device and FIG. 2 shows an oblique view thereof; and, FIG. 3 illustrates a portion of a present invention device with the cage removed but showing an optional but preferred inverted T-brace attachment.

Referring now to FIG. 1, there is shown a side view of a present invention horse mucking rake device 1. It includes a handle 3 which is connected to frame 5 via neck 35. Connection may be by threading, by rivets, by gluing, by force fit or any other known means. Handle 3 has an imaginary axis along its length as shown as axis 41. There are tines such as tine 6 which includes upper segment 7 with a top 9 and a bottom 11, and lower segment 13 with a top 15 and a bottom 17. Upper segment 7 has its top 9 connected to frame 5 and at its bottom 11, it is connected to the top 15 of lower segment 13. The bottom 17 of lower segment 13 has a terminus or/and as shown. This may be a round tip, a pointed tip, a flat tip, a flattened surface or other end. Note that the upper segment 7 is substantially parallel to handle 3 and lower segment 13 forms an angle with upper segment 7 as well as with imaginary axis 41. This angle would be between about 30° and 60° and angles between 45° and 60° are preferred.

Figure 2:
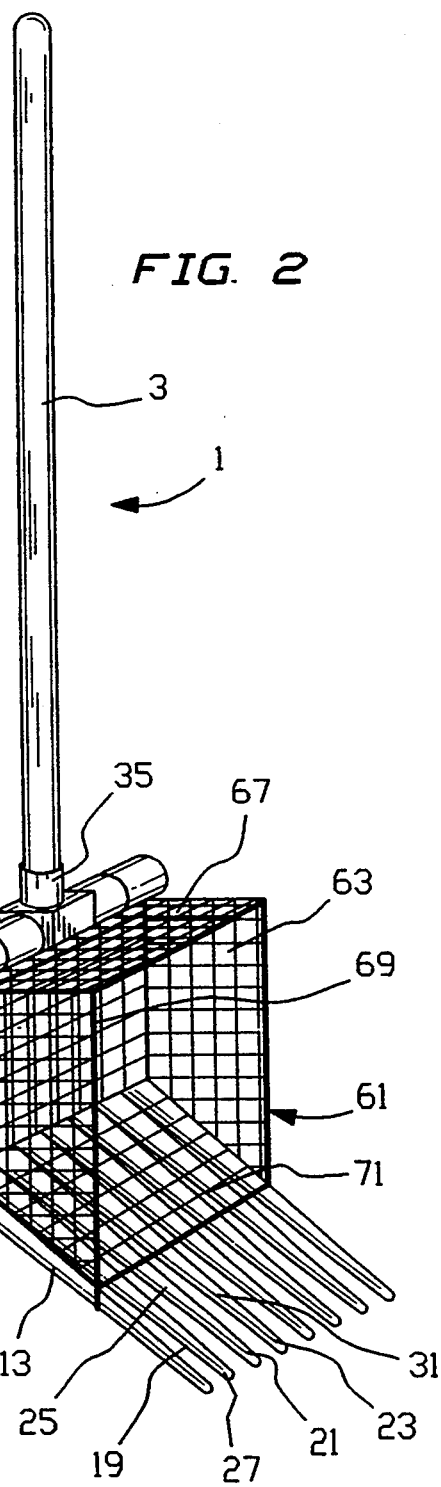

Referring now to both FIGS. 1 and FIG. 2, FIG. 2 shows a perspective view of present invention device 1 and identical parts shown in both figures are identically numbered. As can be seen in FIG. 2, frame 5 expands at right angles on both sides of handle 3 to form a substantially flat frame having a predetermined width.

Cage 61 is a critical feature of the present invention and cage 61 includes bottom section 69, back wall 67, sidewalls 63 and 65 and front 71. Note that bottom 69 is substantially parallel to upper segment 7 of tine 6 and that front 71 is parallel to lower segments 13, 19, 25, 31 etc. Thus, there is an angle formed between the front 71 of cage 61 and the bottom 69 of cage 61 which is substantially equal to the angle between the lower segments of the tines and the handle.

Cage 61 is shown as a metal or plastic woven structure and could be made of metal wire or flat plastic to form the lattices as shown. The open areas of the lattice structure forming cage 61 have width's which are less than the width between the tines such as tines 25 and 31. This is to increase the amount of manure retained by creating an ability to hold smaller pieces of manure than the tines alone. Further, as all horse persons would know, mucking requires not only raking but shaking the rake to allow crushed stone, wood chips or other bedding material to fall through the rake while the manure is retained. However, in a normal operation, the rake does not have any sidewalls or cage and some of the manure rolls of the sides either from the shaking or from the size or amount of the manure being picked up or from the slight tilting or all of these factors. The present invention device, however, overcomes all of these problems and enables a user to perform a mucking function which would normally take 30 minutes per stall in less than about 7 or 8 minutes.

Thus, a present invention device such as shown in FIG. 1 was utilized by a mucker to perform mucking operations within a stall and, a normal mucking operation for that same horse and stall with a conventional rake would take 30 minutes. It was observed that the mucking time was reduced down to about 20% to 25% of the time it would otherwise take without the present invention device.

The basket may be interwoven lined by liner or lattice by lattice with the tines and the rake frame or it may be held in by an occasional twisted wrap or wire such as wires 43, 45 and 47 shown in the figures. Other means of attachment such as clips, heat welding of plastic, male/female plastic loop strips or any other conventional attachment mechanism could be used.

Figure 3:
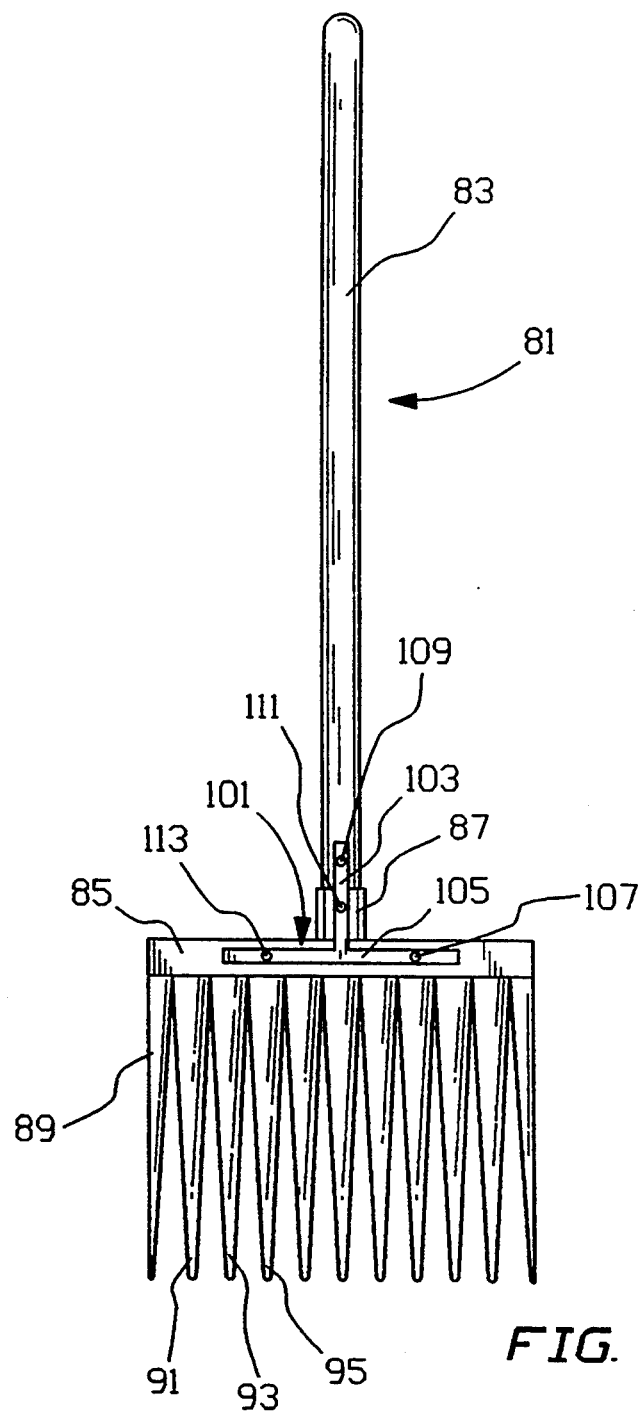

Referring to FIG. 3, there is shown a back view of a present invention horse mucking rake device 81 but with the basket removed. Device 81 includes handle 83 and tines such as tines 89, 91, 93 and 95 and these would have upper segments and lower segments just as the device 1 shown is FIGS. 1 and 2. In this back view, frame 85 includes a neck 87 into which handle 83 has been attached. To provide additional strength to the device 81 and to enable heavier loads of manure to be retrieved with the device, an inverted T brace 101 is attached thereto so is to include the wide portion of frame 85 and the neck portion 87 and, optionally, a lower part of handle 83. Screws 107, 109, 111 and 113 retain the inverted T-brace 101 which includes an upright section 103 and a horizontal section 105, as shown. This optional feature is important to preferred embodiments with the present invention do to the fact that the present invention device will carry substantially greater loads with each rake stroke and structural integrity will become significantly more important.

The present invention device may be one which is manufactured in a single manufacturing process or, it may be the result of a retro fit of certain existing devices so as to modify them to include the T-brace, as well as the important cage as described. The front of the cage used in the present invention device should extend down a portion of the lower segment of the tines, and, in some embodiments may extended the full length of the tines but in preferred embodiments, will extend about half way up the length of the upper segment of the tines.

The present invention devices have been presented for illustrative purposes only and the invention may, in its specific embodiments, have different characteristics. For example, a present invention device may have 20 tines over a frame width of 15 to 16 inches. The tines may be tubular or flat and may be of even thickness or may be tapered.

Obviously, numerous modifications and variations of the present invention are possible in light of the above teachings. It is therefore understood that within the scope of the appended claims, the invention may be practiced otherwise than as specifically described herein.

What is claimed is:

1. A horse mucking rake device, which comprises:
(a) a substantially straight elongated handle;
(b) a base frame connected to said handle, said base frame extending outwardly at right angles from said handle at its area of connection to said handle, in a substantially flat plane to establish a predetermined frame width;
(c) a plurality of tines extending from said base frame at right angles to said frame width, each of said tines having an upper segment and a lower segment wherein the upper segment has a top and a bottom and the lower segment also has a top and bottom, said upper segment of each of said tines being parallel to said handle in a direction of extension and being parallel to one another, and being connected to said frame at its top and being connected to the top of a corresponding lower segment at its bottom, said lower segment of each of said tines being non-parallel to said handle in said direction of extension and being parallel to one another, and forming an angle with an imaginary axis extending from said handle of about 30° to about 60°, said lower segment of each of said tines forming a terminus at its bottom; and,
(d) a cage having a bottom, sidewalls, a back and a front and having an open top, said front of said cage forming an angle relative to its bottom of about 30° to about 60°, said angle being approximately equal to the angle formed between the lower segment of each of said tines and said imaginary axis extending from said handle, said cage being connected directly to said frame, and said cage also being connected to said tines such that its bottom is connected directly to at least some of said upper segments of said tines and its front is connected to at least some of said lower segments of said tines.

2. The device of claim 1 wherein said cage is an interwoven cage of metal wire.

3. The device of claim 1 wherein said frame and tines are formed of plastic.

4. The device of claim 2 wherein said frame and tines are formed of plastic.

5. The device of claim 1 wherein said frame and tines are formed of metal.

6. The device of claim 2 wherein said frame and tines are formed of metal.

7. The device of claim 1 wherein cage has a width approximately equal to the frame width.

8. The device of claim 2 wherein cage has a width approximately equal to the frame width.

9. The device of claim 1 wherein said frame has an auxiliary inverted T-brace connected to said frame and said handle.

10. The device of claim 1 wherein said cage is connected to said frame at an intersection of said cage bottom and said cage back.

11. The device of claim 1 wherein said cage has an open lattice bottom.

12. The device of claim 11 wherein said tines have a predetermined fixed distance between each other and the open lattice bottom of said cage has lattice openings having cross-sections which are smaller than the distance between said tines.

13. The device of claim 12 wherein said cage is an interwoven cage of metal wire.

14. The device of claim 12 wherein said frame and tines are formed of plastic.

15. The device of claim 13 wherein said frame and tines are formed of plastic.

16. The device of claim 12 wherein said frame and tines are formed of metal.

17. The device of claim 13 wherein said frame and tines are formed of metal.

18. The device of claim 12 wherein cage has a width approximately equal to the frame width.

19. The device of claim 13 wherein cage has a width approximately equal to the frame width.

20. The device of claim 12 wherein said frame has an auxiliary inverted T-brace connected to said frame and said handle.

* * * * *